(12) United States Patent
Makley et al.

(10) Patent No.: US 8,941,987 B2
(45) Date of Patent: Jan. 27, 2015

(54) MEMORY COOLING DUCT

(75) Inventors: Albert Vincent Makley, Morrisville, NC (US); Timothy Samuel Farrow, Cary, NC (US); William Fred Martin-Otto, Apex, NC (US); Marc Richard Pamley, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 278 days.

(21) Appl. No.: 13/430,384

(22) Filed: Mar. 26, 2012

(65) Prior Publication Data

US 2013/0250505 A1    Sep. 26, 2013

(51) Int. Cl.
*H05K 7/20* (2006.01)

(52) U.S. Cl.
USPC ............ 361/679.49; 361/679.31; 361/679.51; 361/715; 454/184; 165/177; 165/104.11

(58) Field of Classification Search
CPC .................................. G06F 1/20; G06F 1/185
USPC ........ 361/679.46–679.54, 688–723; 454/184; 312/236; 417/360; 165/80.2–805, 165/104.11, 104.33, 177; 174/547, 548
See application file for complete search history.

(56) References Cited

U.S. PATENT DOCUMENTS

| | | | |
|---|---|---|---|
| 6,498,731 B1 * | 12/2002 | Roscoe et al. | 361/796 |
| 6,711,013 B2 * | 3/2004 | Wobig et al. | 361/679.47 |
| 6,822,863 B1 * | 11/2004 | Artman et al. | 361/695 |
| 7,505,266 B2 * | 3/2009 | Sanchez et al. | 361/695 |
| 7,623,344 B2 * | 11/2009 | Beall et al. | 361/679.48 |
| 7,626,819 B1 * | 12/2009 | Chen | 361/695 |
| 7,835,155 B2 * | 11/2010 | Gelfond et al. | 361/759 |
| 2004/0136159 A1 * | 7/2004 | Hein | 361/688 |
| 2005/0280990 A1 * | 12/2005 | Goodenough et al. | 361/695 |
| 2007/0035923 A1 * | 2/2007 | Beall et al. | 361/687 |
| 2007/0091567 A1 * | 4/2007 | Hayashi | 361/695 |
| 2008/0101021 A1 * | 5/2008 | Sanchez et al. | 361/695 |
| 2011/0278836 A1 * | 11/2011 | Hsu | 285/82 |

* cited by examiner

*Primary Examiner* — David M Sinclair
*Assistant Examiner* — Robert Brown
(74) *Attorney, Agent, or Firm* — Brian J. Pangrle (57) ABSTRACT

A memory cooling duct can include: a front end and a back end; a top that includes a fan mount disposed between the front end and the back end; a front end vent; a front edge, a back edge and opposing side edges that define a rectangular bottom opening; and a flexible lever at the front end that includes a locking surface for locking the memory cooling duct over a rectangular array of memory sockets. Various other apparatuses, systems, methods, etc., are also disclosed.

16 Claims, 8 Drawing Sheets

MEMORY COOLING DUCT

TECHNICAL FIELD

Subject matter disclosed herein generally relates to devices and methods for cooling memory.

BACKGROUND

Memory, such as integrated circuit-based memory (IC-based memory), operates using electricity, which can generate heat energy. According to a process known as Joule heating (e.g., or ohmic heating, resistive heating, etc.), heat energy is generated responsive to flow of current through a conductor (e.g., non-superconducting conductor). An amount of heat energy generated by Joule heating may be estimated given a resistance R and a current I (e.g., $R*I^2$). For IC-based memory, a rise in temperature, temperature cycling, prolonged elevated temperature, etc., may affect performance, longevity, etc., of the memory. Temperatures such as junction temperature, case temperature, etc., as well as thermal resistances such as junction-case, junction-board, junction-ambient, etc., may be germane to such effects. An IC-based memory module may include a maximum junction temperature, for example, for use in determining where or how the module may be used. For some memory installations, one or more options may exist (e.g., heat sinks, fins, fans, ambient or environmental control, etc.) to dissipate heat energy generated by IC-based memory. Such options may act to "cool" memory, for example, to dissipate heat energy in a manner to maintain temperature, reduce temperature, etc.

As an example of IC-based memory, consider dynamic random access memory (DRAM) in the form of ICs bonded and mounted into packages with conductor pins for connection to control signals, buses, etc. As to format, a DRAM module may be provided, for example, in the form of a single inline memory modules (SIMM), a dual inline memory module (DIMM) or another type of module (e.g., dual inline package "DIP", single inline pin package "SIPP", etc.). A module may include memory that is stacked, for example, where two or more ICs are stacked on top of each other. Factors such as memory type, format, use, etc., may affect generation of heat energy as well as dissipation of heat energy. Further, equipment, conditions, etc., for dissipation of heat energy may be relevant to overall design, performance, cost, etc., of a memory installation and may potentially give rise to constraints.

SUMMARY

A memory cooling duct can include: a front end and a back end; a top that includes a fan mount disposed between the front end and the back end; a front end vent; a front edge, a back edge and opposing side edges that define a rectangular bottom opening; and a flexible lever at the front end that includes a locking surface for locking the memory cooling duct over a rectangular array of memory sockets. Various other apparatuses, systems, methods, etc., are also disclosed.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
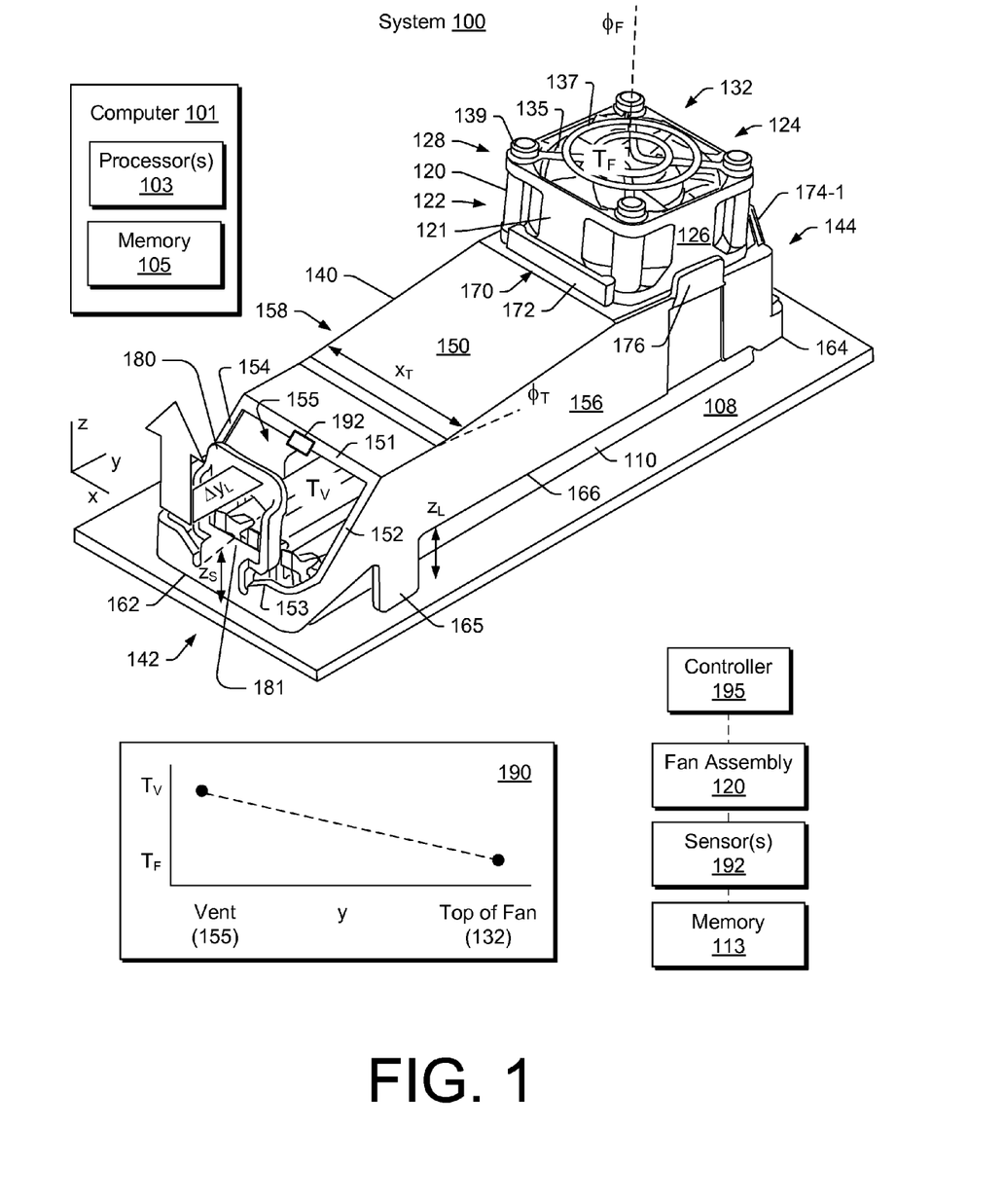
FIG. 1 is a perspective view of an example of a system that includes an example of a memory cooling duct along with an example of a plot and an example of a controller.

FIG. 1 shows, with respect to a Cartesian coordinate system (x, y, z), an example of a system 100 that includes a board 108, a rectangular array of memory sockets 110 mounted to the board 108, and a fan assembly 120 mounted to a memory cooling duct 140. FIG. 1 also shows an example of a computer 101 that includes one or more processors 103 and memory 105, an example of a temperature plot 190, and an example of an optional controller 195. As an example, the computer 101 may include the system 100 where the memory cooling duct 140 may provide for cooling the memory 105.

In the example of FIG. 1, the memory cooling duct 140 includes a front end 142 and a back end 144, a top 150 that includes a front end vent 155 and a fan mount 170 mounted between the front end 142 and the back end 144, a front edge 162, a back edge 164, opposing side edges 166 and 168 (not shown), and a lever 180 at the front end 142.

In the example of FIG. 1, the lever 180 may flex (e.g., be a flexible lever) and include a locking surface 181. In such an example, the locking surface 181 can provide for locking the memory cooling duct 140 over the array of memory sockets 110. For example, the front edge 162, the back edge 164 and the opposing side edges 166 and 168 may define a rectangular bottom opening where the flexible lever 180 at the front end 142 includes the locking surface 181 for locking the memory cooling duct over the rectangular array of memory sockets 110.

In the example of FIG. 1 the locking surface 181 is disposed at a height $z_S$, which may correspond to height of a component or components of an array of memory sockets. For example, the height $z_S$ may correspond approximately to a height of a surface of a memory connector tab (e.g., a lower or downward facing surface). In such an example, the locking surface 181 may be positioned below the surface of a memory connector tab, optionally with some clearance to avoid contact (e.g., to avoid transmission of stress, vibration, etc.). Once seated underneath, the locking surface 181 can lock the memory cooling duct 140 with respect to an array of memory sockets, optionally allowing for some amount of movement along one or more directions. Thus, the memory cooling duct 140 may be moveable (e.g., slidable) with respect to the board 108.

In the example of FIG. 1, the front end vent 155 is defined, at least in part, by a frame that includes a top edge 151, a bottom edge 153 and opposing side edges 152 and 154. The fan assembly 120 may direct air downwardly into the memory cooling duct 140 such that most of the air exits outwardly via the front end vent 155. Alternatively, where the fan assembly 120 operates to draw air outwardly (e.g., in a direction away from the fan and the duct along its axis), air may enter inwardly via the front end vent 155.

In the example of FIG. 1, as the top 150 of the memory cooling duct 140 has an upward slope (e.g., in z direction for increasing y, per angle $\phi_T$), natural convection may cause hot air to rise and exit, for example, via the fan assembly 120 (e.g., at times where no power is provided to the fan assembly 120, for a failure of the fan assembly 120, etc.). Also shown in the example of FIG. 1, a fan angle $\phi_F$ may deviate from a direction normal to the x, y-plane. As described herein, a fan angle may be selected to, for example, reduce fan noise, direct air at an angle, reduce fan noise and direct air at an angle, etc.

In the example of FIG. 1, a large arrow shows approximate motion of the lever 180 to move the locking surface 181 (e.g., outward motion along the y-axis per $\Delta y_L$) and to lift the front edge 162 (e.g., upward motion along the z-axis) to thereby lift the front end 142 of the memory cooling duct 140 (e.g., to access to the rectangular array of memory sockets 110 mounted to the board 108). As shown, the front end vent 155 may provide a gap (e.g., along the y-axis) that allows for access to the lever 180, for example, to ease access to the lever 180 for outward movement (e.g., a finger-width gap).

In the example of FIG. 1, the memory cooling duct 140 can provide for tool-less installation and removal with respect to the rectangular array of memory sockets 110. The memory cooling duct 140 may stand on one or more feet (see, e.g., a foot 165) with or without contacting the rectangular array of memory sockets 110 (e.g., base, memory locking tabs, etc. of the sockets 110). When in a locked position, the memory cooling duct 140 may be secure for purposes of shipping, drop testing, etc. (e.g., optionally with some clearance between the duct 140 and the array of memory sockets 110). As an example, one or more feet of the memory cooling duct 140 may be slidable (e.g., moveable on the board 108). For example, where clearance or clearances exist between the memory cooling duct 140 and the array of memory sockets 110 and where the memory cooling duct 140 includes feet, the memory cooling duct 140 may slide on its feet (e.g., some amount determined by the clearance or clearances).

In the example of FIG. 1, as mentioned, the memory cooling duct 140 may include one or more feet to contact the board 108 and to provide for stability, locking, proper positioning, etc., of the memory cooling duct 140. In the example of FIG. 1, the memory cooling duct 140 includes opposing sides 156 and 158 (not shown) and the foot 165, which extends downward from the side 156 to contact the board 108. In such an example, the opposing side 158 may include a similar foot 167 (not shown). A memory cooling duct may include one or more feet positioned with respect to one or more sides, edges, etc., to stand the memory cooling duct on a surface or surfaces. For example, the memory cooling duct 140 may include one or more feet at the back end 144. As an example, a memory cooling duct may include a fan and stand on feet that contact a board where such contact exerts a force due to mass of the memory cooling duct and mass of the fan and acceleration of gravity. Sliding of the memory cooling duct and the fan, as an assembly, on the board may occur, for example, where frictional force at contact points between the memory cooling duct and the board is overcome (e.g., responsive to shifting or tiling the board).

In the example of FIG. 1, the fan assembly 120 includes a fan frame 121 that includes a front side 122, a back side 124, opposing lateral sides 126 and 128 (see arrow), a top side 132, a bottom side 134 (not shown), a motorized fan 135, a guard 137 and mounting hardware 139 (e.g., bolts) for mounting the motorized fan 135 and the guard 137 to the fan frame 121. A fan assembly may be symmetric with respect to its sides 122, 124, 126 and 128, for example, to allow for installation of the fan assembly with respect to the mount 170 in one of various orientations (e.g., 0, 90, 180 and 270 degrees of rotation with respect to the mount 170). Depending on operational conditions, cooling requirements, etc., maximum fan speed may not require use of a guard such as the guard 137 (e.g., the guard 137 may be optional). As an example, a fan angle may be selected that directs air in the memory cooling duct 140 along surfaces of memory installed in the array of memory sockets 110 to provide sufficient heat transfer at a fan speed for the fan 120 where the guard 137 may be optional (e.g., according to one or more safety standards). While FIG. 1 shows a single box-shaped fan assembly, other types of fan assemblies may be provided for a mount provided to mount such a fan assembly. In the example of FIG. 1, the mount 170 provides for tool-less installation and removal of the fan assembly 120.

In the example of FIG. 1, for mounting of the box-shaped fan assembly 120, the fan mount 170 of the memory cooling duct 140 includes a front wall 172, back clips 174-1 and 174-2 (not shown) and side walls 176 and 178 (not shown). For installation, the front side 122 of the fan frame 121 may be positioned with respect to the front wall 172 and the back side 124 of the fan frame 121 may be rotated downward toward the back clips 174-1 and 174-2 to achieve a locked orientation where the mount 170 biases the fan frame 121 between the front wall 172 and the back clips 174-1 and 174-2. The side walls 176 and 178 may optionally provide for some biasing as well between the opposing lateral sides 126 and 128 of the fan frame 121. The biasing force applied by the mount 170 to the fan frame 121 may be sufficient to hold the fan assembly 120 in place for purposes of shipping, drop testing, etc.

As to dimensions of the memory cooling duct 140, height may be selected based at least in part on height of a memory card (e.g., SIMM, DIMM, etc.) received by a memory socket. By minimizing height, air flow within the memory cooling duct 140 may be directed more to the sides of a memory card where memory ICs are seated. Further, by minimizing height, the cross-sectional area may be reduced, which in turn may help increase air flow velocity (e.g., along the y-axis) and resulting heat transfer.

Where memory ICs generate heat (e.g., during operation), the heat may be transferred to a cooling fluid (e.g., air), which causes the fluid to rise from an inlet temperature $T_{in}$ (e.g., a fan inlet temperature $T_F$) to an outlet temperature $T_{out}$ (e.g., a vent outlet temperature $T_V$). Referring to the example of FIG. 1, the memory cooling duct 140 allows for flow along one or more memory cards as seated in respective sockets 110, where for multiple memory cards, heat may be transferred to cooling fluid flowing in a space between adjacent memory cards or between a memory card and one of the walls 156 and 158 of the memory cooling duct 140. Heat transfer may be characterized at least in part by the equation: $\Delta Q/\Delta t = h_{plate} A (T_{plate} - T_{in})$. In this equation, the flux of energy ($\Delta Q/\Delta t$) is equal to the heat transfer coefficient for a plate ($h_{plate}$), the area of the plate (A) and the temperature difference between the plate and the cooling fluid ($T_{plate} - T_{in}$). For such an equation, a plate may be a surface of a memory card (e.g., a memory chip or other component of a memory card). Heat transfer may optionally be characterized by Reynolds number (ratio of inertial forces to viscous forces), Prandtl number (ratio of kinematic viscosity and thermal diffusivity), Nusselt number (ratio of convective to conductive heat transfer across a surface) or Grashof number (ratio of the buoyancy to viscous force acting on a fluid).

In the plot 190, two temperatures are shown with respect to the y-axis for an example where one or more memory cards are seated in the rectangular array of memory sockets 110 and energized in a manner that generates heat energy. As indicated, the temperature at the front end vent 155 ($T_V$) exceeds the temperature at the top side 132 of the fan assembly 120 ($T_F$). Thus, in this example, the fan assembly 120 directs cooler air into the memory cooling duct 140 where heat is transferred to the air, which then exits via the memory cooling duct 140 mostly via the front end vent 155. The system 100 may optionally include one or more sensors for sensing one or more conditions that pertain to cooling. For example, the system 100 may include a temperature sensor 192 to measure temperature at or near the front end vent 155 of the memory cooling duct 140. Ambient temperature representative of a fan inlet temperature may be measured elsewhere (e.g., optionally at the top side 132 of the fan assembly 120). Provided with a fan speed and such temperatures, a temperature differential may be determined, which may be indicative of heat energy being generated by one or more memory cards seated in the sockets 110. In the example of FIG. 1, the controller 195 may provide for sensing, control, etc., with respect to the fan assembly 120, the sensor 192, and memory 113 seated in one or more of the memory sockets 110.

In general, low volume, but high velocity airflow can help to cool and enhance reliability of IC-based memory. In the example of FIG. 1, the memory cooling duct 140 sits above the rectangular array of memory sockets 110, for example, to impinge cool air on one or more memory cards seated in the array of memory sockets 110. As mentioned, a fan may be disposed at an angle (see, e.g., $\phi_F$) where the angle may help direct flow along length of one or more memory cards.

As to material of construction of the memory cooling duct 140, as an example, a material such as polycarbonate may be used or other suitable material. As an example, a memory cooling duct may be formed as a unitary component, for example, via injection molding (e.g., using a cavity and a core configured to form a memory cooling duct). With respect to injection molding, one or more gates may be formed and trimmed, etc., to provide a finished (or semi-finished) component. As to material of construction, it may provide for flexibility of a lever for movement of a locking surface, for example, in conjunction with dimensions associated with the lever.

Figure 2:
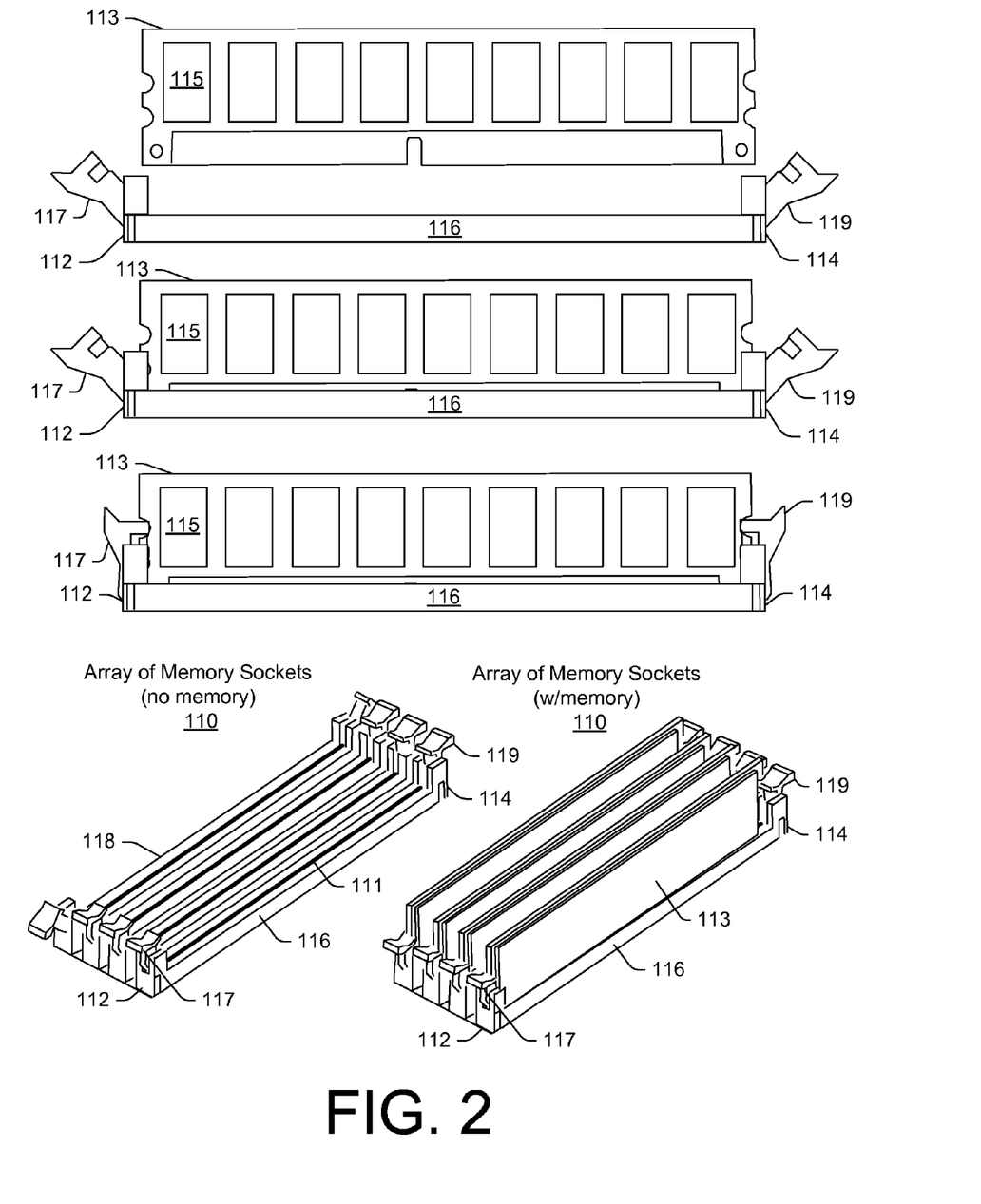
FIG. 2 is a series of views of examples of memory with respect to examples of memory sockets.

FIG. 2 shows an example of a memory card 113, a memory socket 116 and an array of memory sockets 110 with and without memory cards installed. More particularly, FIG. 2 shows a pre-installation view of the memory card 113 with respect to the memory socket 116, an installed view with open tabs 117 and 119 and an installed view with closed tabs 117 and 119 (rotated clockwise and counter-clockwise, respectively). In the example of FIG. 2, the memory socket 116 includes opposing ends 112 and 114 with the respective memory connector tabs 117 and 119 while the memory card 113 includes one or more memory ICs 115 (e.g., optionally stacked, non-stacked, etc.). As shown, the memory card 113 has a substantially rectangular shape where short ends may have one or more features that cooperate with a respective one of the memory connector tabs 117 and 119 while one of the long ends includes electrical conductors (e.g., to mate with conductors in of a memory socket 116).

In a perspective view of the array 110 without memory installed, each memory socket 116 is shown as including a slot for receipt of a portion of a memory card. Upon installation of four memory cards in four slots of the array 110, spaces are defined between adjacent memory cards. As shown in the example of FIG. 2, such spaces tend to be long and narrow. Further, for a memory card installed in an outer socket, one side of the memory card does not face a side of another memory card. During operation, such a side may experience different thermal conditions than interior sides (e.g., sides that define the spaces between adjacently installed memory cards). Spacing and other factors may determine cross-sectional area for flow and, for a given volumetric flow, provide for approximate flow velocities (e.g., along y-direction in FIG. 1).

Figure 3:
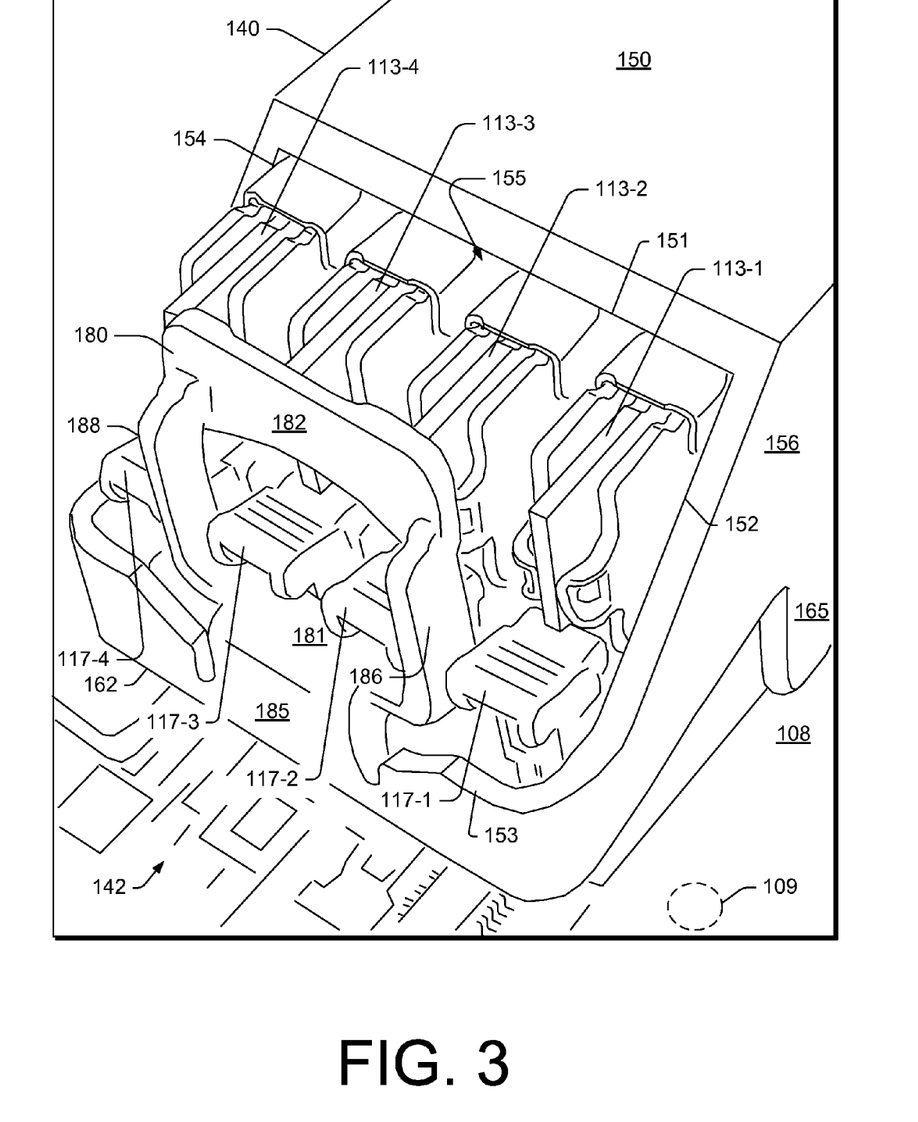
FIG. 3 is a perspective view of an example of a front end of a memory cooling duct.

FIG. 3 shows a perspective view of the front end 142 of the memory cooling duct 140 in the system 100 as including four memory cards 113-1, 113-2, 113-3, and 113-4 installed in respective sockets of the rectangular array of memory sockets 110. In the example of FIG. 3, each of the memory sockets in the array 110 includes a memory connector tab 117-1, 117-2, 117-3, and 117-4 where the tabs 117-2 and 117-3 are disposed at least partially above the locking surface 181 (see, e.g., z-direction in FIG. 1).

With respect to the front end 142 of the memory cooling duct 140, a stem 185 rises from the front edge 162 and meets the locking surface 181 at a height just below a lower height of the memory connector tabs 117-2 and 117-3. In the example of FIG. 3, the locking surface 181 is disposed between opposing arms 186 and 188 which also support a handle 182 of the lever 180. As an example, a flexible lever may include a locking surface and a handle disposed between two arms where the handle may be moved to control position of the locking surface. For example, the flexible lever 180 includes the locking surface 181 and the handle 182 disposed between the arms 186 and 188 where movement of the handle 182 causes movement of the locking surface 181 (e.g., by pivoting of the stem 185). In the example of FIG. 3, the front end 142 includes cutouts adjacent to the stem 185 (e.g., on either side along the x-direction), which act to define the stem 185. The depth of these cutouts may be selected in conjunction with material properties, thickness, etc., to provide for suitable flexibility of the stem 185.

While the example of FIG. 3 shows a single stem arrangement, a memory cooling duct may be provided with more than one stem or with another arrangement of features to provide at least one locking surface for positioning with respect to one or more memory connector tabs (e.g., to lock the memory cooling duct with respect to an array of memory sockets).

FIG. 3 also shows a dashed circle 109, which may be an aperture for fixation of, for example, a metal framed cooling system (e.g., for bolting the system to the board 108). In contrast, the memory cooling duct 140 may be positioned with respect to the board 108 and the array of memory sockets 110 without use of such an aperture (e.g., or associated bolts, etc.). As an example, a memory cooling duct may be loosely supported on a board such that some freedom of movement exists for the memory cooling duct with respect to the board. In such an example, the memory cooling duct 140 may be slidable (e.g., moveable) on the board 108.

Figure 4:
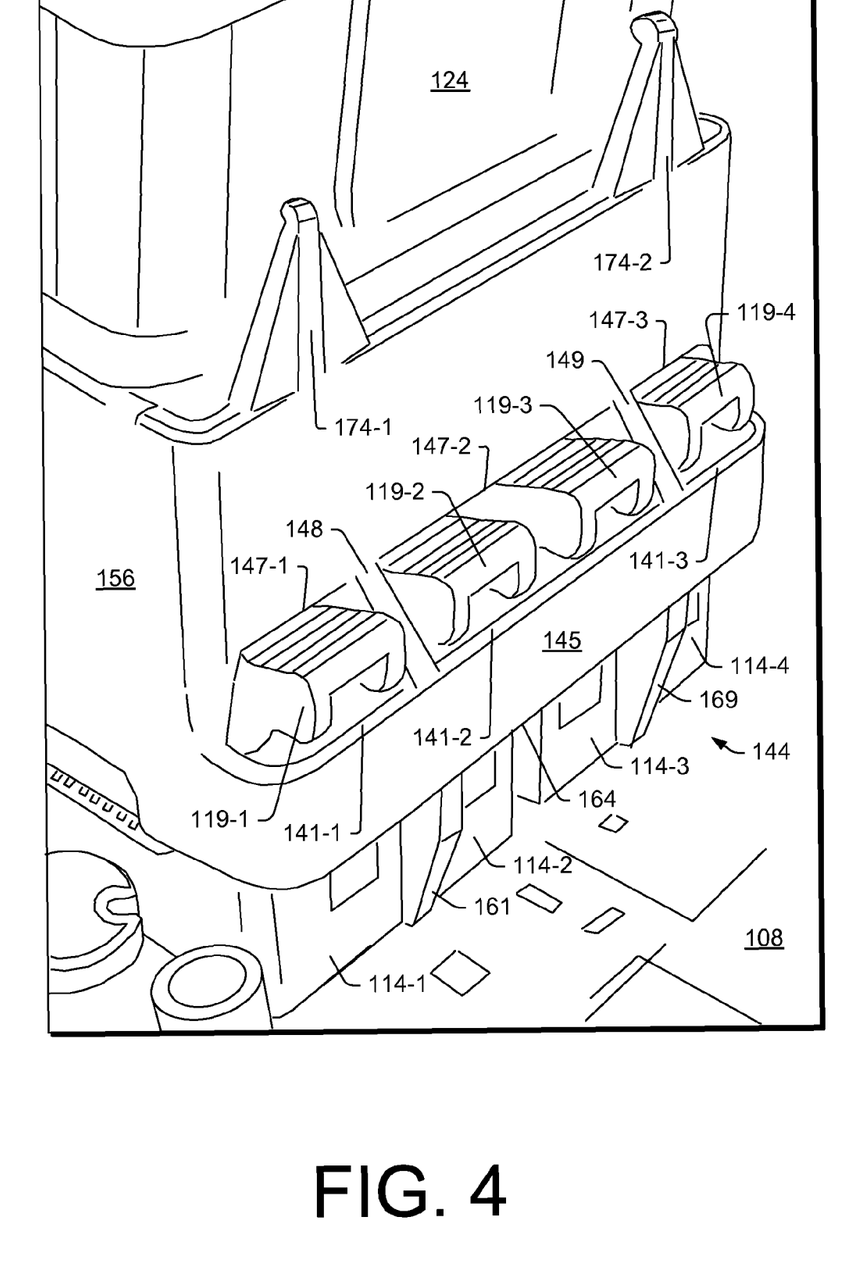
FIG. 4 is a perspective view of an example of a back end of a memory cooling duct.

FIG. 4 shows a perspective view of the back end 144 of the memory cooling duct 140 of the system 100 of FIG. 1 where the array of memory sockets 110 includes four memory connector tabs 119-1, 119-2, 119-3 and 119-4. In the example of FIG. 4, the memory cooling duct 140 includes one or more surfaces 141-1, 141-2 and 141-3 positioned at a height (or heights) to seat below a lower surface (e.g., downward facing) of one or more of the memory connector tabs 119-1, 119-2, 119-3 and 119-4. For example, the surface 141-1 seats below a surface of the tab 119-1, the surface 141-2 seats below a respective surface of each of the tabs 119-2 and 119-3, and the surface 141-3 seats below a surface of the tab 119-4.

The structure of the back end 144 of the memory cooling duct 140 may include braces 148 and 149 that define, in part, windows 147-1, 147-2 and 147-3 configured for receipt of one or more memory connector tabs. For example, each of the windows 147-1 and 147-3 is configured for receipt of a single memory connector tab while the window 147-2 is configured for receipt of two memory connector tabs. In the example of FIG. 4, the braces 148 and 149 extend downwardly to support, form or support and form feet 161 and 169 where each of the feet 161 and 169 includes a leg portion that is angled (e.g., upwardly and outwardly).

As an example for installation of the memory cooling duct 140, the feet 161 and 169 may be positioned at an angle in contact with the board 108 and then drawn forward between adjacent ends 114-1 and 114-2 and 114-3 and 114-4 of the array of sockets 110 to position memory connector tabs in the windows 147-1, 147-2 and 147-3. The front end 142 of the memory cooling duct 140 may then be rotated downwardly such that each of the back end surfaces 141-1, 141-2 and 141-3 is positioned below at least a portion of at least one of the memory connector tabs 119-1, 119-2, 119-3, and 119-4. At the front end 142, the lever 180 may be flexed to position the locking surface 181 below at least one of the memory connector tabs (see, e.g., the tabs 117-2 and 117-3 of FIG. 3) and the feet 165 and 167 positioned on the board 108 to support the memory cooling duct 140. In such an example, the memory cooling duct 140 is supported on the board 108, for example, by the feet 165, 167, 161 and 169. Further, as an example, given an array of memory sockets such as in FIG. 2, the memory cooling duct 140 may be locked even where no memory cards are installed in the sockets of the array.

Figure 5:
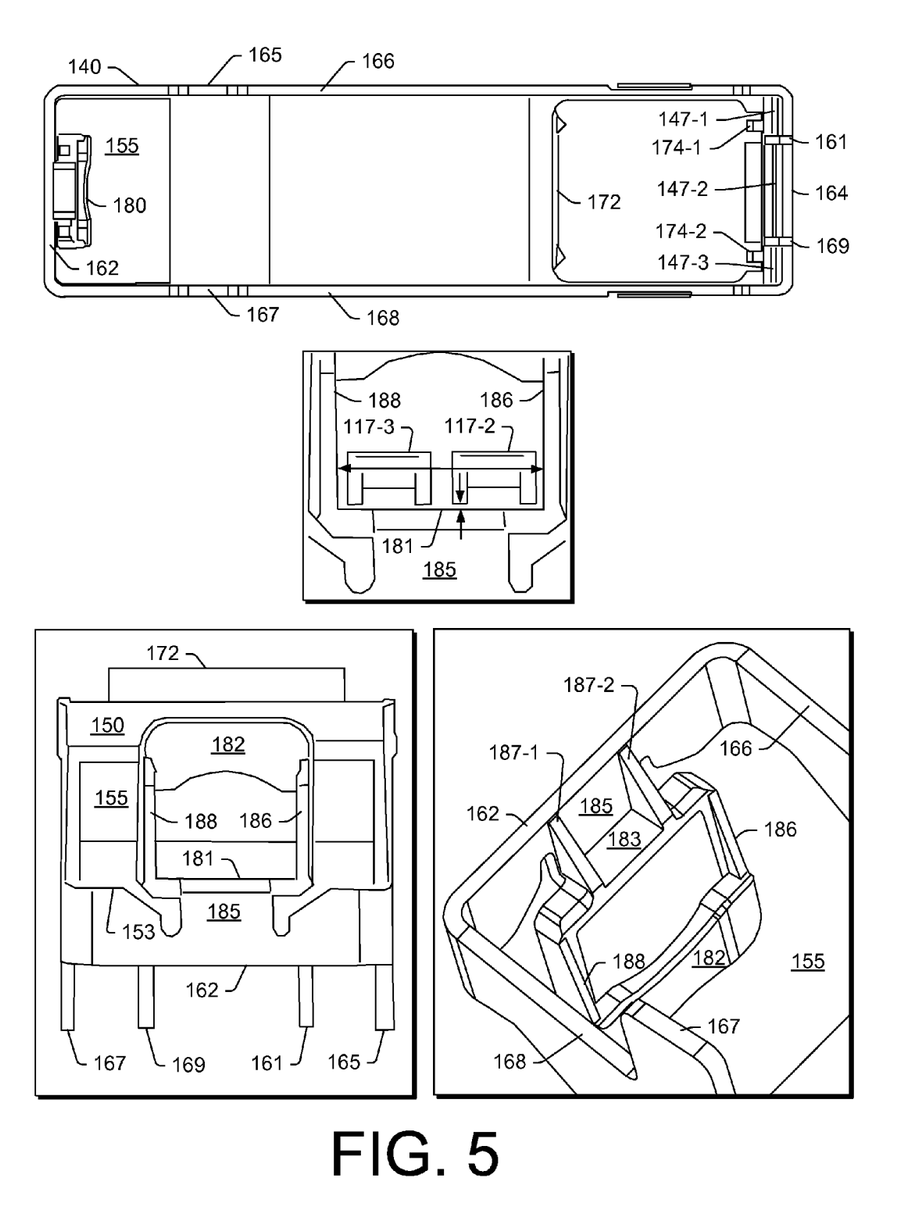
FIG. 5 is a series of views of an example of a memory cooling duct.

FIG. 5 shows various views of the memory cooling duct 140 including a bottom view, end views and a perspective view. In an end view, two memory connector tabs 117-2 and 117-3 are shown as being positioned a distance above the locking surface 181 along with a spacing between the arms 186 and 188 sufficient for receipt of the two memory connector tabs 117-2 and 117-3. In another end view, the feet 165, 167, 161 and 169 are shown (e.g., where a distance in an x direction between the feet 167 and 169 is larger than the width of a memory socket, where a distance in an x direction between the feet 169 and 161 is larger than the width of two memory sockets, and where a distance in an x direction between the feet 161 and 165 is larger than the width of a memory socket). In a perspective view, the stem 185 of the flexible lever 180 is shown as including two braces 187-1 and 187-2 that extend from the front edge 162 to a lower surface 183, disposed below the locking surface 181 (e.g., a bridge that includes the locking surface 181 as an upper surface and the surface 183 as a lower surface). In such an example, the two braces 187-1 and 187-2 act to support the locking surface 181 (e.g., to add rigidity and support if contact is made with one or more memory connector tabs).

In the example of FIG. 5, the handle 182 of the flexible lever 180 includes a front facing surface and a back facing surface. For purposes of installation or removal, pressure may be applied to the back facing surface of the handle 182. In such an example, the stem 185 may act as a spring such that biasing of the flexible lever 180 by applying pressure to the back facing surface of the handle 182 causes outward movement of the locking surface 181 to a biased position (e.g., an unlocked position). Upon release of such pressure (e.g., unbiasing), spring action of the stem 185 can cause the locking surface 181 to move inwardly to a "relaxed" position (e.g., a locked position).

Figure 6:
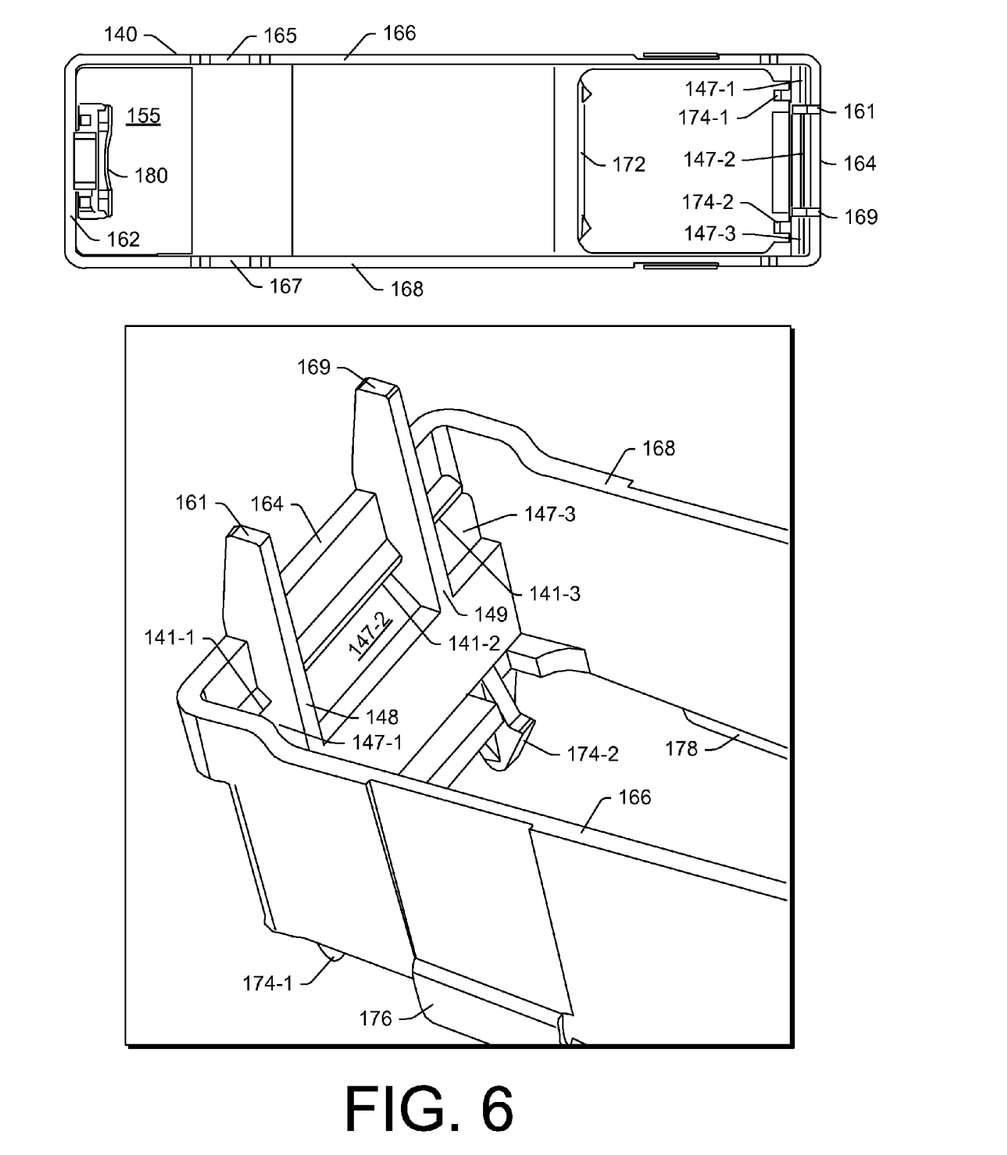
FIG. 6 is a bottom view and a perspective view of an example of a memory cooling duct.

FIG. 6 shows a bottom view and a perspective view of the memory cooling duct 140. As mentioned, the braces 148 and 149 may extend to the feet 161 and 169, respectively. Further, as mentioned, the braces 148 and 149 may define, in part, the windows 147-1, 147-2, and 147-3, for example, along with, in part, the surfaces 141-1, 141-2 and 141-3. In an installed configuration, at the back end 144 of the memory cooling duct 140, the surfaces 141-1, 141-2 and 141-3 may be supported by the braces 148 and 149, for example, if contact may occur with respect to one or more memory connector tabs. Further, if contact occurs, force of such contact is in a direction that does not provide for rotation of a memory connector tab to an open position. Accordingly, contact between a memory cooling module and one or more memory connector tabs is unlikely to cause a memory card to become dislodged from its slot. Configuration of the locking surface 181 at the front end 142 of the memory cooling duct 140 provides for similar contact and force transmission (e.g., unlikely to cause a memory connector tab to open).

Figure 7:
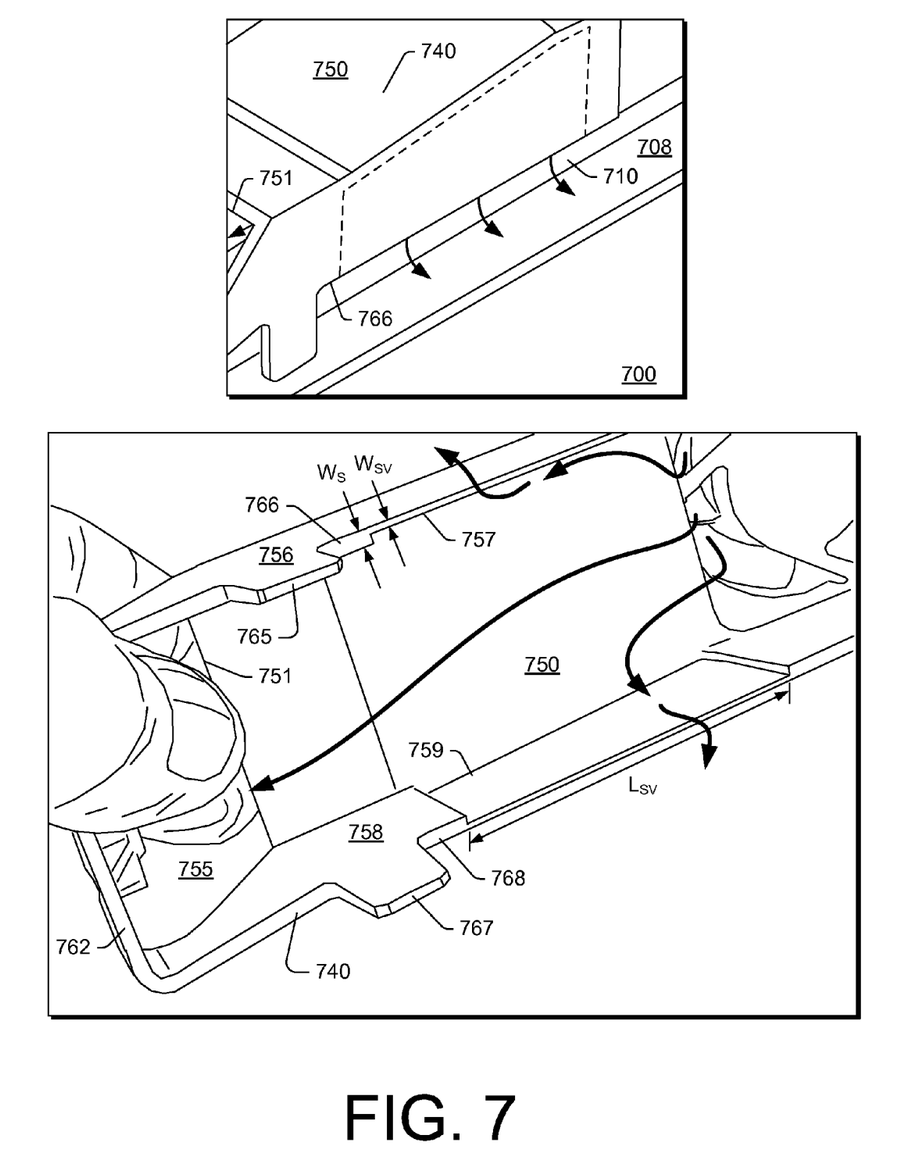
FIG. 7 is a series of perspective views of an example of a memory cooling duct.

FIG. 7 shows two perspective views of an example of a system 700 that includes a memory cooling duct 740. In the example of FIG. 7, the system 700 includes a board 708 and an array of memory sockets 710. In the example of FIG. 7, the memory cooling duct 740 includes various features such as at least some of those of the memory cooling duct 140 of FIG. 1. For example, the memory cooling duct 740 includes a top 750, a frame edge 751 for a front vent 755, a front edge 762, opposing side edges 766 and 768, opposing sides 756 and 758, and feet 765 and 767.

For purposes of directing air flow, in the example of FIG. 7, the opposing sides 756 and 758 include undercuts 757 and 759, respectively. Arrows indicate a general direction of air flow for a fan that introduces air into the memory cooling duct 740 where each of the undercuts 757 and 759 act to enhance air flow along an outer side of an outer memory card positioned in an outer one of the array of memory sockets 710. The undercuts 757 and 759 may act to form side vents that direct air downwardly and outwardly with respect to the board 708.

As to dimensions, an undercut or vent may be of a length ($L_{SV}$) sufficient to cool one or more ICs positioned on a memory card and of a depth ($W_{SV}$) that does not compromise support of a side of a memory cooling duct. Further, an undercut or vent may be positioned a distance from a front vent, for example, to enhance flow in a region that the front vent would not otherwise have much impact. Thus, in the example of FIG. 7, the undercuts 757 and 759 are positioned a distance from the front vent 755.

Figure 8:
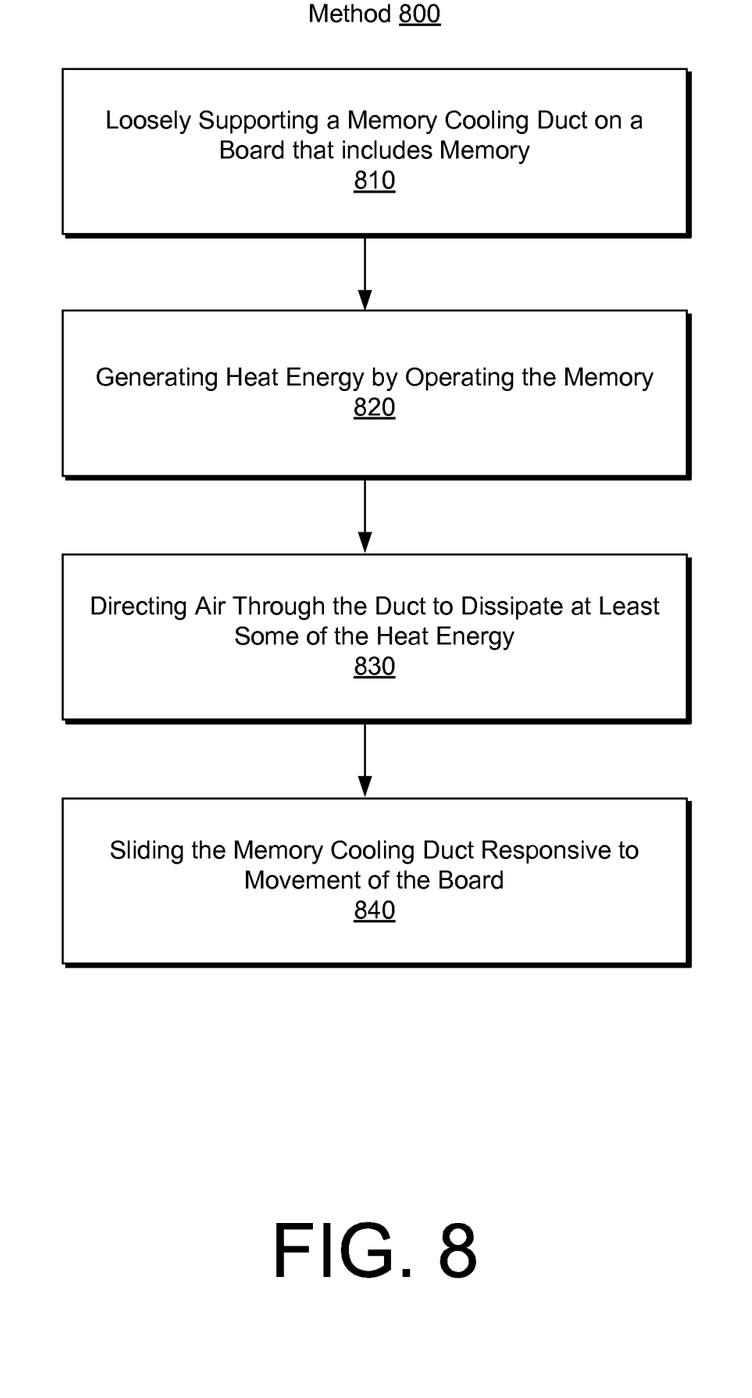
FIG. 8 is a block diagram of an example of a method.

FIG. 8 shows an example of a method 800 that includes loosely supporting a memory cooling duct on a board that includes memory 810, generating heat energy by operating the memory 820, and directing air through the duct to dissipate at least some of the heat energy 830. In the example of FIG. 8, the method 800 may further include sliding the memory cooling duct responsive to movement of the board. For example, the memory cooling duct 140 stands on feet 165, 167, 161 and 169 on the board 108. As the memory cooling duct 140 is loosely supported, for example, in that it is not bolted to the board 108, movement of the board 108 (e.g., tilting, shifting, etc.) may cause the memory cooling duct 140 to slide on the board 108. As an example, consider sliding of the feet 165, 167, 161 and 169 in the y direction where such sliding may be limited based on one or more clearances between the memory cooling duct 140 and the array of memory sockets 110. As another example, consider movement of the memory cooling duct 140 with respect to a direction normal to a plane defined by the board 108. For example, for a computer being transported that includes the system 100, in response to a bump in a road, a shift in a flight, etc., the memory cooling duct 140 may move in the direction normal to the plane defined by the board 108 where such movement may be limited based on one or more clearances between the memory cooling duct 140 and the array of memory sockets 110.

While various examples mentioned "loosely supporting" or "loosely supported", as an example, a memory cooling duct may be considered "free standing", "moveable" or "slidably positioned", etc., to indicate that the memory cooling duct has some freedom of movement, optionally in three-dimensions.

For a loosely supported memory cooling duct, a board may define a plane where movement of the memory cooling duct may occur in the plane. As another example, a board may define a plane having a direction normal thereto where movement of the memory cooling duct may occur in the direction normal to the plane. As an example, a memory cooling duct may form contacts with a board via slidable feet where a method may include sliding the slidable feet responsive to movement of the board.

As an example, a method can include: providing a duct that includes a front end and a back end, a top that includes a fan mount disposed between the front end and the back end, a front end vent, a front edge, a back edge and opposing side edges that define a rectangular bottom opening, and a flexible lever at the front end that includes a locking surface; providing a rectangular array of memory sockets; positioning the back edge of the duct at a back end of the rectangular array of memory sockets; biasing the flexible lever to move the locking surface outwardly; and positioning the locking surface beneath a portion of at least one memory connector tab of the rectangular array of memory sockets to secure the duct with respect to the rectangular array of memory sockets (e.g., optionally with clearance between the duct and the at least one memory connector tab).

As an example, the foregoing method may include biasing the flexible lever to move the locking surface outwardly; and raising the front edge of the duct away from the front end of the rectangular array of memory sockets to provide for removing at least one memory card from one of the memory sockets or for installing at least one memory card in one of the memory sockets.

As an example, a method may include mounting a fan to a memory cooling duct via fan mount. In such an example, a mounting process may include positioning the fan with respect to a rigid extension of the fan mount and rotating the fan with respect to a flexible extension of the fan mount to secure the fan with respect to the duct. As an example, a memory cooling duct may be provided with a fan mounted via a fan mount. As an example, a method may include energizing a fan to move air within the duct.

As an example, a memory cooling duct can include a front end and a back end; a top that includes a fan mount disposed between the front end and the back end; a front end vent; a front edge, a back edge and opposing side edges that define a rectangular bottom opening; and a flexible lever at the front end that includes a locking surface for locking the memory cooling duct over a rectangular array of memory sockets. In such an example, the memory cooling duct may be a unitary component.

As an example, a memory cooling duct can include feet for standing the memory cooling duct on a board. One or more of such feet may optionally be slidable in one or more directions (e.g., to allow for sliding of the memory cooling duct on a board).

As an example, a memory cooling duct can include a snap mount for a fan. Such a mount may provide for mounting of a fan at an angle offset from gravity (e.g., where a rotational axis of the fan is offset from gravity).

As an example, a memory cooling duct can include a back end that includes one or more windows or openings where, for example, each of the one or more openings is configured to receive one or more memory connector tabs of an array of memory sockets. As an example, a memory cooling duct may include a front vent configured for receipt of memory connector tabs of an array of memory sockets. In such an example, the front vent may provide for access to at least a portion of a lever (e.g., to an end of a flexible lever that can move a locking surface). As to a locking surface of a flexible lever, such a surface may be a flat surface for seating beneath a portion of at least one memory connector tab of an array of memory sockets.

A memory cooling duct can include opposing side edges of opposing sides that extend to a top of the memory cooling duct. In such an example, the sides may include one or more interior surfaces that include one or more undercuts to direct flow. For example, an undercut may help to direct airflow to an outer surface of a memory card positioned in a socket of an array of memory sockets.

As an example, a system can include: a board with one or more processors, and memory cards disposed in a rectangular array of memory sockets; and a vented duct and fan assembly that includes a front end and a back end, a front edge and a back edge disposed at opposing ends of the rectangular array of memory sockets, feet in contact with the board, and a flexible lever at the front end that includes a locking surface that locks the vented duct and fan assembly over the rectangular array of memory sockets. Such a system may include a power supply to supply regulated power to at least the fan. As an example, a system may include a vented duct with a vent that provides access to a flexible lever for locking the duct with respect to an array of memory sockets.

As an example, an injection mold for receiving moldable material can include a cavity and a core where receipt of the core by the cavity defines a contiguous space to form a cooling duct that includes a front end, a back end, a top that includes a fan mount disposed between the front end and the back end, a front end vent, a rectangular bottom opening defined by a front edge, a back edge and opposing side edges; and a lever at the front end that includes a locking surface to lock the memory cooling duct over a rectangular array of memory sockets. In such an example, the cavity may include recesses to form fan mount extensions.

Although some exemplary methods, devices, systems, arrangements, etc., have been illustrated in the accompanying Drawings and described in the foregoing Detailed Description, it will be understood that these examples as disclosed are not limiting, but are capable of numerous rearrangements, modifications and substitutions without departing from the spirit set forth and defined by the following claims.

The invention claimed is:

1. A memory cooling duct comprising:
   a front end and a back end that comprises one or more openings;
   a top that comprises a fan mount disposed between the front end and the back end;
   a front end vent;

a front edge, a back edge and opposing side edges that define a rectangular bottom opening; and a flexible lever at the front end that comprises a locking surface for locking the memory cooling duct over a rectangular array of memory sockets wherein each of the one or more openings is configured to receive one or more memory connector tabs of the rectangular array of memory sockets and is defined at least in part by a respective surface positioned to seat directly below one or more respective lower surfaces of the one or more received memory connector tabs.

2. The memory cooling duct of claim 1 comprising a unitary component.

3. The memory cooling duct of claim 1 further comprising feet for standing the memory cooling duct on a board.

4. The memory cooling duct of claim 1 wherein the fan mount comprises a snap mount.

5. The memory cooling duct of claim 3 wherein respective ends of the feet define a plane and wherein the fan mount mounts a fan at an angle offset from the plane.

6. The memory cooling duct of claim 1 wherein the front vent is configured for receipt of memory connector tabs of the rectangular array of memory sockets.

7. The memory cooling duct of claim 1 wherein the locking surface of the flexible lever comprises a flat surface for seating beneath a portion of at least one memory connector tab of the rectangular array of memory sockets.

8. The memory cooling duct of claim 1 wherein the front end vent provides for access to at least an end of the flexible lever.

9. The memory cooling duct of claim 1 wherein the opposing side edges comprise edges of opposing sides that extend to the top.

10. The memory cooling duct of claim 1 wherein the at least one of the sides comprises an interior surface that comprises one or more undercuts to direct flow.

11. A system comprising:

a board that comprises one or more processors, and memory cards disposed in a rectangular array of memory sockets that comprise memory connector tabs wherein each of the memory connector tabs comprises a lower surface; and a vented duct and fan assembly that comprises a front end, a back end and at least one end opening, a front edge and a back edge disposed at opposing ends of the rectangular array of memory sockets, feet in contact with the board, and a flexible lever at the front end that comprises a locking surface that locks the vented duct and fan assembly over the rectangular array of memory sockets wherein each of the at least one end opening receives one or more of the memory connector tabs of the rectangular array of memory sockets and is defined at least in part by a respective surface that seats directly below one or more of the lower surfaces of the one or more of the received memory connector tabs.

12. The system of claim 11 further comprising a power supply to supply regulated power to at least the fan.

13. The system of claim 11 wherein the vented duct of the vented duct and fan assembly comprises a vent that provides access to the lever.

14. A memory cooling duct comprising:

a front end and a back end;

a top that comprises a fan mount disposed between the front end and the back end;

a front end vent;

a front edge, a back edge and opposing side edges that define a rectangular bottom opening; and a flexible lever at the front end that comprises a locking surface for locking the memory cooling duct over a rectangular array of memory sockets wherein the locking surface of the flexible lever comprises a flat surface for seating beneath a portion of at least one memory connector tab of the rectangular array of memory sockets.

15. The system of claim 11 wherein the one or more of the memory connector tabs are each disposed in a closed position.

16. The system of claim 15 wherein the vented duct and fan assembly prohibits movement of each of the one or more of the memory connector tabs to an open position.

* * * * *